United States Patent Office 2,770,940
Patented Nov. 20, 1956

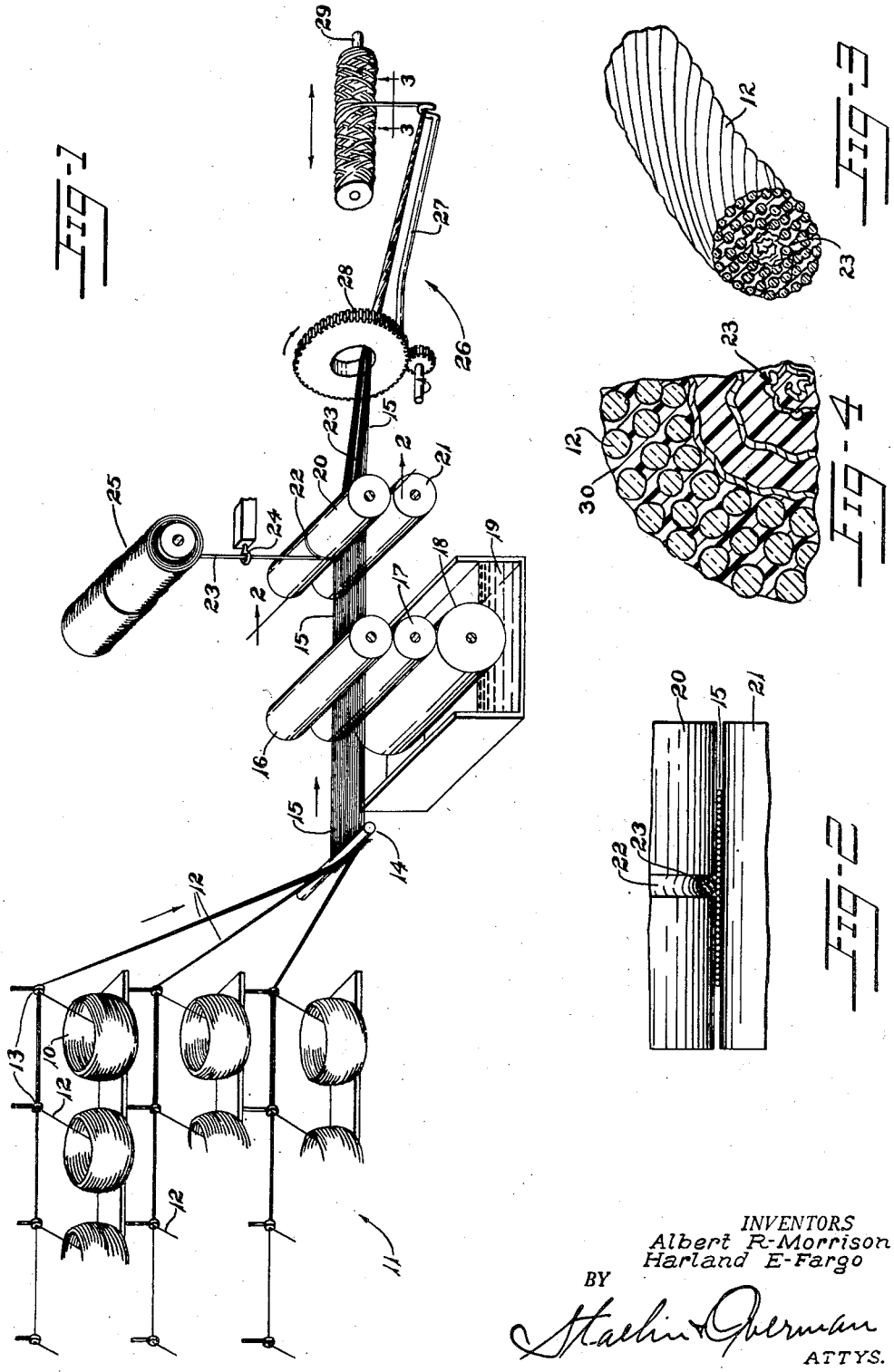
INVENTORS
Albert R. Morrison
Harland E. Fargo

2,770,940

GLASS FIBER TWINE AND METHOD OF MANUFACTURING THE SAME

Albert R. Morrison and Harland E. Fargo, Newark, Ohio, assignors to Owens-Corning Fiberglas Corporation, Toledo, Ohio, a corporation of Delaware Application July 12, 1952, Serial No. 298,508

5 Claims. (Cl. 57—150)

This invention relates to a glass fiber twine and to a method for manufacturing such a twine.

A twine embodying the invention is intended for use in such operations as baling and binding farm products and to supplant the deficient supply of natural fibers such as sisal and hemp in the fabrication of heavy duty twines of this general type.

The fabrication of a heavy duty twine from associated glass fiber strands requires that two principal difficulties be overcome. First, because of the great tensile strength of glass in strands, a twine having a given tensile strength fabricated entirely from glass fiber strands is smaller in diameter than a twine of the same tensile strength twisted from, for example, natural sisal fibers. Because of the large number of machines including twine handling equipment that is designed to handle twines of certain diameters, it is desirable that any twine to be widely employed should have substantially the same diameter as the natural fiber twines for the use of which such machinery has been designed.

Secondly the fabrication of a commercially acceptable glass fiber twine requires that some provision be made to substantially eliminate or at least greatly reduce the self-abrasion of the twine caused by frictional contact between the glass fibers in the strands, between sections of the strands making up the twine, between different sections of the twine or between the twine and other objects.

It is, therefore, the principal object of this invention to provide a glass fiber twine having an easily controllable diameter in the order of the diameters of natural fiber twines heretofore employed in baling and binding and similar operations and of similar tensile strength as such natural fiber twines.

It is another object of this invention to provide a glass fiber twine in which a bulking agent (in itself not possessing particularly great tensile strength) is added to the glass fibers during the formation of twine for increasing the bulk of the finished twine.

It is a still further object of the invention to provide a glass fiber twine in which the glass fiber strands are reasonably protected from each other and from abrasion against other objects or materials.

More specifically it is an object of this invention to provide a paper-glass fiber twine in which a quantity of generally spirally parallel glass fiber strands selected to have a desired tensile strength is associated with and around a bulking core consisting in laterally compacted or twisted paper and both the glass fiber strands and the mass of strands and the core are bound together into a unitary structure by an adhesive which generally fills the interstices in the crushed or twisted paper core and between adjacent glass fiber strands both to maintain unitary integrity of twine and to coat the glass fiber strands protectively.

These objects both general and specific will be more clearly apparent from the specification which follows and from the drawings, in which:

Fig. 1 is a diagrammatic view in perspective of apparatus arranged for the practice of the process constituting one phase of the instant invention in producing a twine embodying the instant invention.

Fig. 2 is a fragmentary enlarged view taken substantially on the line 2—2 of Fig. 1.

Fig. 3 is a greatly enlarged view partly in section and partly in perspective and taken substantially on the line 3—3 of Fig. 1.

Fig. 4 is a still further enlarged, fragmentary view in section of a portion of the end of the twine as shown in Fig. 3.

In practicing a process embodying the invention for the fabrication of a paper-glass fiber twine, a plurality of spools 10 of glass fiber strands are assembled in a creel generally indicated at 11. Each of the strands 12 from the packages 10 may be led through guide eyes 13 and assembled by means of a comb 14 into a flat ribbon-like arrangement indicated at 15. The number of packages 10 of the glass fiber strands 12 and the weight of the strands 12 per yard to be used is, of course, determined by the desired tensile strength of the finished twine, it following that more strands of glass will cumulatively give a higher tensile strength. Each of the strands 12 consists of a relatively large number of individual glass fibers, say, about 200, the group of 200 fibers being loosely associated together to form an individual strand.

After the strands 12 are generally orientated to form the ribbon 15, it is fed between rollers 16 and 17 for the purpose of spreading an adhesive on the glass fiber strands 12. The roller 17 is in surface contact with a pickup roller 18 which runs in a pool of adhesive 19. The roller 17 spreads the adhesive 19 over the undersurface of the ribbon 15 and, in some instances, and when desired, the rate of pickup of adhesive 19 may be such that a selected percentage thereof is forced upwardly between adjacent ones of the glass fiber strands 12 where the rollers 16 may, in turn, spread it over the top surface of the ribbon 15.

The nature of the adhesive 19 which is employed is not at all critical, it being preferable only that it should remain reasonably flexible after drying, that it should have a reasonably good affinity for glass and preferably, since it is to be employed in the baling and binding of farm products, it should not be comestible by farm pests or rodents. Preferably, also the adhesive should be one which when dried has a non-tacky surface thus to eliminate any tendency of the finished twine to adhere to objects with which it is brought into contact. An adhesive suitable for this purpose may be a synthetic resinous adhesive meeting the general requirements outlined above, for example it may be a urea-formaldehyde or polyester adhesive preferably, of course, being applied in a cold liquid state.

After the ribbon-like mass 15 of strands 12 leaves the applying rollers 16 and 17 it is led between a second pair of rollers 20 and 21 (see also Fig. 2), the roller 21 serves as a backing for the ribbon 15 and the roller 20 has a generally central circumferential groove 22 for guiding a paper strand 23 that is led downwardly through a guide eye 24 from a spool 25.

The paper strand 23 preferably is formed by laterally compacting, for example, twisting, rolling or merely crushing, a strip of paper such as 20 pound kraft paper, that has preliminarily been coated with an adhesive. Preferably the adhesive with which the paper strip is coated should be the same as that with which the glass fiber strands 12 are coated but this is not essential if the adhesives are compatible. The paper strand 23 indeed need not be adhesive coated and the adhesives applied to the glass fiber strands 12 may be relied upon to impregnate the paper strand 23 or to merely adhere the glass fiber strands 12 to the paper strand 23. Depending upon the viscosity, penetration power, etc., of the adhesive, various combinations of amount of adhesive and degree of impregnation or adherence can be employed depending upon the particular nature of the paper used or the adhesive believed most effective.

The paper strand 23 has a generally circular cross section and is led downwardly through the grove 22 and fed onto the moving ribbon 15 along its generally median line. The ribbon 15 with its paper core 23 is then led through a twisting mechanism generally indicated at 26 and, in this instance, comprising a flyer 27, flyer gear ring 28 and reciprocal spindle 29. The flyer 27 revolves around the spindle 29 as the spindle 29 reciprocates. The revolution of the ring 28 both twists the ribbon 15 and wraps it around the spindle 29, the wraps being laid up helically because of the spindle reciprocation.

Because the paper strand 23 is led down along the general median line of the ribbon 15, as the ribbon 15 is twisted the glass fiber strands 12 are wrapped in a generally helically extending mass exteriorly of the paper strand core 23, the individual glass fibers lying generally spirally parallel to each other through the length of the twine.

Fig. 3 is an enlarged view showing a cross section of a twine embodying the invention and fragmentarily extends in perspective to show how individual glass fiber strands 12 are twisted around the central crushed paper core 23. Particularly with reference to the still further enlarged fragmentary view, Fig. 4, it will be observed that each interstice, for example, as indicated at 30, between neighboring ones of the strands 12 is substantially filled with the adhesive which thus bonds the strands 12 to each other and to the paper core 23 serving as a matrix for the retention of the twine elements. The glass fiber strands 12 provide the twine with the selected tensile strength and the central paper core 23 bulks the glass fiber strands so that the cross section of the finished twine is comparable in size to that of a natural fiber twine having the same tensile strength.

If desired, an excessive amount of adhesive 19 may be applied so as to provide for an external coating on the finished twine, this giving the exterior of the twine a more nearly cylindrical surface and providing, when desired, for the proper degree of "slipperiness" to allow the twine to be slid around bundles, for example, of grain, stalks or bales of hay. The degree of "slipperiness" also is determined by the necessity for the knots to hold. Too slippery a surface makes the knots slide and renders the twine impractical.

Although no specific apparatus or mechanism is shown in the drawings for applying heat to the twine during its formation, it is necessary, of course, in the use of most adhesives to apply heat for drying, fusing and/or curing. Fusing is frequently required to obtain a smooth even surface; drying is necessary where the solvents or carriers are not sufficiently volatile at normal temperatures and many synthetic adhesives must be cured.

This phase of the process may be performed by means of infra-red heat lamps, by passage between heated rollers or through a heated zone, these and other means for heating the moving twine being well known in the art.

We claim:

1. A paper-glass fiber twine consisting in a core of adhesive bonded, laterally compacted, paper and an exterior sheath of spirally parallel continuous filament glass fiber strands adhered together and to said core by a flexible adhesive.

2. A paper-glass fiber twine consisting of a generally cylindrical core of resin coated paper adhered to an exteriorly extending layer of spirally parallel continuous filament glass fiber strands bonded together by a flexible adhesive matrix.

3. A method for the fabrication of a paper-glass fiber twine that comprises assembling a plurality of adhesive coated continuous filament glass fiber strands into generally ribbon-like relationship, laying a strand of laterally compacted paper along the general median line of such ribbon and twisting the assembled strands together with the glass fiber strands, exterior of the paper strand.

4. A method in accordance with claim 3 in which the center paper core is adhesively coated over its self-contacting surfaces for integrity.

5. A method according to claim 3 in which the ribbon of continuous filament glass fiber strands is coated with a quantity of adhesive such as to substantially fill all interstices between the strands and to provide a thin adhesive coating on the exterior of the twine.

References Cited in the file of this patent

UNITED STATES PATENTS

| Number | Name | Date |
|---|---|---|
| 416,052 | Clark | Nov. 26, 1889 |
| 831,108 | Ryder | Sept. 18, 1906 |
| 2,095,076 | Olson | Oct. 5, 1937 |
| 2,096,606 | Buhler | Oct. 19, 1937 |
| 2,132,702 | Simpson | Oct. 11, 1938 |
| 2,213,290 | Rowe | Sept. 3, 1940 |
| 2,224,274 | Powers | Dec. 10, 1940 |
| 2,313,058 | Francis | Mar. 9, 1943 |
| 2,571,717 | Howald et al. | Oct. 16, 1951 |
| 2,616,239 | Holcomb | Nov. 4, 1952 |

FOREIGN PATENTS

| 577,650 | Great Britain | May 27, 1946 |